US 7,644,017 B2

(12) United States Patent
Pippia et al.

(10) Patent No.: US 7,644,017 B2
(45) Date of Patent: Jan. 5, 2010

(54) METHOD FOR MONITORING PRODUCTS IN A REFRIGERATOR

(75) Inventors: Ennio Pippia, Udine (IT); Massimo Pacorich, Pordenone (IT); Daniele Mari, Trieste (IT)

(73) Assignee: Electrolux Professional S.p.A., Pordenone (IT)

( * ) Notice: Subject to any disclaimer, the term of this patent is extended or adjusted under 35 U.S.C. 154(b) by 178 days.

(21) Appl. No.: 11/550,437

(22) Filed: Oct. 18, 2006

(65) Prior Publication Data

US 2007/0150381 A1 Jun. 28, 2007

(30) Foreign Application Priority Data

Oct. 20, 2005 (IT) .............................. PN05A0075

(51) Int. Cl.
*G06Q 10/00* (2006.01)
(52) U.S. Cl. ..................... 705/28; 705/29; 235/382; 235/385; 340/572.1
(58) Field of Classification Search ............. 705/28; 235/385; 700/115; 340/572.1, 10.2, 540
See application file for complete search history.

(56) References Cited

U.S. PATENT DOCUMENTS

| | | | | |
|---|---|---|---|---|
| 5,963,134 | A * | 10/1999 | Bowers et al. | ........... 340/572.1 |
| 5,969,606 | A | 10/1999 | Reber et al. | |
| 6,693,539 | B2 * | 2/2004 | Bowers et al. | ........... 340/572.1 |
| 7,005,965 | B2 * | 2/2006 | Chen et al. | ................. 340/10.2 |
| 7,258,276 | B2 * | 8/2007 | Linton et al. | ................. 235/385 |
| 2002/0121961 | A1 * | 9/2002 | Huff | ............................ 340/5.3 |
| 2005/0194437 | A1 * | 9/2005 | Dearing et al. | .............. 235/382 |
| 2005/0258961 | A1 * | 11/2005 | Kimball et al. | .......... 340/572.1 |
| 2006/0022827 | A1 * | 2/2006 | Higham | ................... 340/572.1 |
| 2008/0284604 | A1 * | 11/2008 | Rubinstein | ............... 340/572.4 |

FOREIGN PATENT DOCUMENTS

EP 0 974 798 A2 1/2000

OTHER PUBLICATIONS

RFID: Promise and Peril; Imagine a future in which every food item has an RFID and your refrigerator has a scanner, Machron, Bill, PC Magazine, Nov. 25, 2003, vol. 22 iss. 21, p. 57.*

* cited by examiner

*Primary Examiner*—F. Zeender
*Assistant Examiner*—Marissa Thein
(74) *Attorney, Agent, or Firm*—Pearne & Gordon LLP

(57) ABSTRACT

Method for monitoring products in a refrigerator, wherein the refrigerator (1) comprises at least a compartment (2) for containing products (3), a door (4) adapted to close said compartment (2) and radio frequency transmission means (5) adapted to communicate with a plurality of transponders (6) associated with said products (3) to detect the presence of said transponders (6) into the compartment (2), each transponder (6) being able to send a specific identification code, the method comprises: detecting said transponders in static condition of closed door (C1), detecting said transponders during a time period (T1) which represents a dynamic phase of door opening (C2), detecting said transponders during a second time period (T2) which represents a dynamic phase of closing door (F2), comparing said transponders (6) detected in static condition (C1) and in dynamic condition (F1, F2), and their time events of detection for determining the transponders introduced and extracted, respectively, from the refrigerator during the condition of open door (C2).

20 Claims, 2 Drawing Sheets

METHOD FOR MONITORING PRODUCTS IN A REFRIGERATOR

This invention relates to a method for monitoring products in a refrigerator.

There are refrigerators known to comprise radio-frequency transmission systems designed to communicate with transponders that are placed on the food products stored in the refrigerator.

Packaged or covered food items are provided with transponders that can receive electromagnetic signals emitted by the transmission systems. These transponders, powered by the incoming signals, are capable of sending to the transmission systems an electromagnetic signal that contains an identification code and is characteristic for each respective transponder, as well as for instance information on the food item to which the transponder concerned is assigned.

This enables the user to monitor the food products stored in the refrigerator, employing means such as a computer that is connected to the transmission systems.

EP 0 974 798 and U.S. Pat. No. 5,969,606 describe refrigerators equipped with radio-frequency transmission systems for monitoring the transponders that are assigned to the food products stored in the refrigerator.

The fields generated by the transmission system and the transponders in the refrigerator can superimpose themselves on one another, creating destructive interference patterns. As a result, the field generated in any given section inside the refrigerator can be nullified, impeding any transponder response. When its door is closed, the refrigerator constitutes a cavity completely surrounded by a metal enclosure. Inside that cavity it is possible for the distribution of the electromagnetic field to have multiple zero-field zones. If a transponder in the refrigerator is lined up with such a zone, it receives no power and therefore cannot respond.

Moreover, the high reflectivity of the refrigerator walls can cause a given signal to travel to a certain point inside the refrigerator through a multitude of different reflections, which can lead to mutual cancellation or to field-weakening interference patterns. Consequently, the detectability of the transponders can be drastically reduced, thus making it impossible to effectively monitor not only the presence of the transponders inside the refrigerator but also the process of placing and removing items in/from the refrigerator.

This present invention is therefore aimed at introducing a method for monitoring products in a refrigerator, whereby it is possible to effectively determine the presence as well as the insertion and removal processes of a transponder in the refrigerator after the refrigerator door was opened by the user.

One objective of the invention is the realization of a method whereby it is possible to effectively combine the transponder responses generated when the refrigerator door is open and those when the refrigerator door is closed, to allow a determination of which transponders have been inserted in or removed from the refrigerator every time the user opens the refrigerator door.

Another objective is the introduction of a method that guarantees maximum reliability and safety.

These objectives, and others that will become evident further below, are achieved by a method for monitoring products inside a refrigerator, having the characteristic features described in claim 1 and subsequent claims appended to this patent application.

Additional characteristics and advantages will become evident from the description of a preferred but non-exclusive form of implementation of the invention, illustrated as a non-limiting example in the attached drawings in which—

Figure 1:
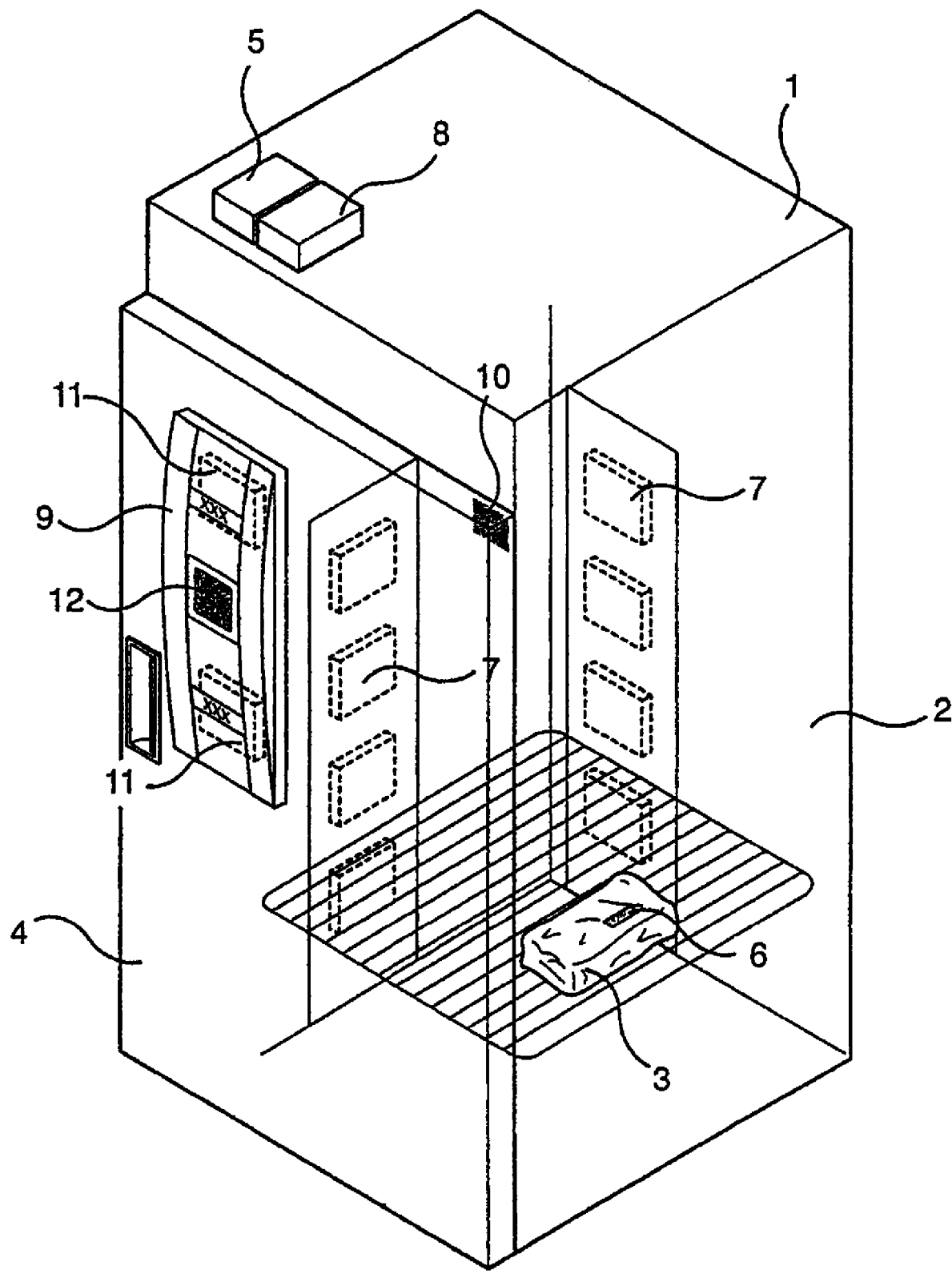
FIG. 1 is a perspective view of a refrigerator equipped to employ the method according to this invention.
Figure 2:
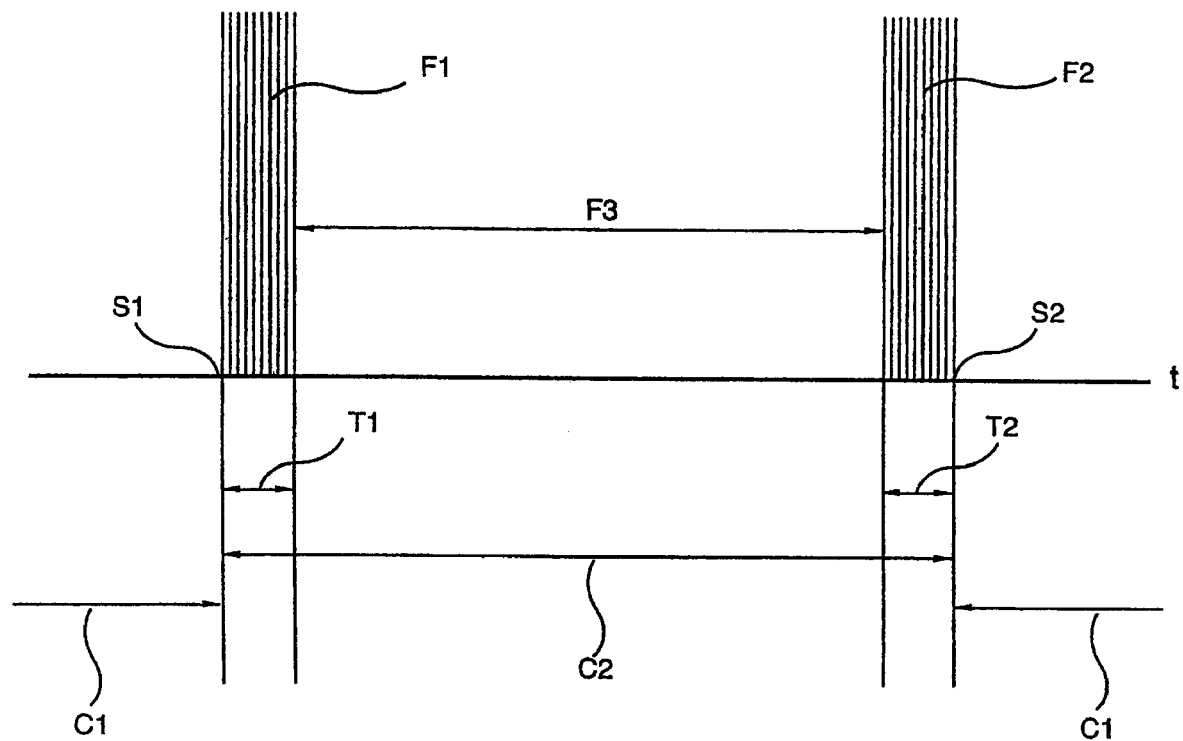
FIG. 2 is a schematic diagram showing the time sequence of the phases of a door opening/closing cycle.

Referring to these figures, a refrigerator 1 encompasses at least one compartment 2 for storing products 3, with a door 4 serving to close off the said compartment 2, as well as radio frequency transmission systems 5 designed to communicate with a plurality of transponders 6 that are assigned to the products 3, for detecting the presence of these transponders 6 in the compartment 2, each transponder 6 being capable of transmitting a specific identification code. The method for monitoring products inside the refrigerator includes the following phases:

Detecting a time-based door opening event (S1) and a time-based door closing event (S2) to distinguish between a closed-door state (C1) and an open-door state (C2);

Scanning, during the closed-door state (C1), said compartment 2 by means of radio frequency transmission systems 5 for detecting the presence of transponders 6, and memorizing the identification codes of the transponders thus detected;

Determining, after the detection of a time-based door opening event (S1), a first time interval (T1) that immediately follows said time-based event (S1) and is representative of a dynamic door opening phase (F1), said time interval (T1) being counted from the start of the said time-based door opening event (S1) with a duration so preset that it is too short for a user to insert or withdraw any products 3 in/from the refrigerator during that first time interval (T1) in the dynamic door-opening phase (F1).

Detecting the presence of products (3) in the compartment (2) during that first time interval (T1) and memorizing the identification codes of the detected transponders;

Detecting, in continuous fashion throughout the open-door state (C2), the presence of transponders 6 in relation to the compartment 2, memorizing the time-based events of the detection of the transponders 6 and updating these time-based events as a function of the last detection of the transponders 6 by the radio frequency transmission systems 5 during the open-door state (C2);

Determining, after the detection of a time-based door closing event (S2), a second time interval (T2) that immediately precedes the said time-based event (S2) and is representative of a dynamic door closing phase (F2), said time interval (T2) being counted backwards from the said time-based door closing event (S2) and having a duration so preset that it is too short for a user to insert or withdraw any products 3 during that second time interval (T2) in the dynamic door-closing phase (F2);

Selecting the identification codes of the transponders 6 whose time-based detection event during the open-door state (C2) falls within the second time interval (T2) in the dynamic door closing phase (F2);

Comparing the identification codes of the transponders 6 thus selected with those detected during the closed-door state (C1) and during the said first time interval (T1) in the dynamic door opening phase (F1);

Assuming the transponders 6 detected during the second time interval (T2) alone to have been inserted in the compartment 2 of the refrigerator 1 during the open-door state (C2);

Assuming the transponders 6 detected during the closed-door state (C1) and/or during the first time interval (T1), but not those detected during the second time interval (T2), to have been removed from the compartment 2 of the refrigerator 1 during the said open-door state (C2).

The radio frequency transmission systems 5 encompass an RFID (radio frequency identification device) capable of sending and receiving electromagnetic signals via a plurality of internal antennas 7 that are positioned inside the compartment 2.

By means of these internal antennas 7 the RFID scans the compartment 2, emitting electromagnetic signals in order to detect the transponders 6 that are present in the refrigerator 1. The transponders 6, powered by the electromagnetic signals, continuously transmit to the RFID a radio frequency identification code, which unequivocally identifies each individual transponder 6 and thus the product 3 to which it is assigned. Based on the identification code received, the RFID detects the presence of the transponder 6 concerned.

These particular transponders 6 are commonly known as radio frequency tags.

The tags 6 are attached to the packages of the products 3 that are to be stored in the refrigerator 1, in such fashion that a particular identification code is assigned to each product.

The refrigerator 1 is also provided with control devices 8 designed to memorize and compare the identification codes of the detected tags 6 so as to monitor, in real time, the products 3 that are present in the refrigerator 1. The control devices 8 are capable of determining whether the detection of a tag 6 is to be associated with a permanent event of the tag in the refrigerator, with an insertion event of the tag into the refrigerator or with a removal event of the tag from the refrigerator.

The control devices 8 continuously manage and update a user-accessible database in which the identification codes of the tags 6 present in the refrigerator 1 are stored.

By means of a programming station 9, described in more detail below, it is possible to assign to each identification code of a tag, before it is placed in the refrigerator 1, a string of data characterizing the product to which the transponder is attached. These data that can indicate for instance the category, classification and expiration date, can be retrieved and viewed by a user by way of the database.

Sensors 10, connected to the control devices 8, are provided to monitor the door 4 of the refrigerator 1 so as to detect a time-based door-opening event (S1) and a time-based door-closing event (S2), thus differentiating between a closed-door state (C1) and an open-door state (C2).

In the closed-door state (C1) the detection of a tag identification code is unambiguously associated with the presence of the tag 6 and thus of the corresponding product 3 in the compartment 2 of the refrigerator 1. Tests performed, however, have shown that not all of the tags 6 present in the compartment 2 are detectable in the closed-door state (C1), which is why the detections in that state cannot fully reflect the entirety of tags 6 present in the refrigerator 1. During the dynamic door-opening and door-closing phases (F1, F2), the radio frequency transmission systems 5, via the internal antennas 7, are able to detect essentially all of the tags 6 that are present in the refrigerator because of the configurational variations of the electromagnetic field due to the movement of the metal door.

The control devices 8 therefore provide within the open-door state (C2) two short time intervals (T1, T2), one of them relative to the dynamic door opening phase (F1), the other relative to the dynamic door closing phase (F2), whose respective duration is set in a manner whereby no tag 6 can be inserted in or removed from the refrigerator by the user during these intervals. In practice, these time intervals (T1, T2) are selected with an extremely short duration during which it would be physically impossible for the user to place any products in, or remove them from, the refrigerator.

In this fashion, even the readings taken within the two time intervals (T1, T2) can be related to the physical presence of the tags in the refrigerator.

Based on the data provided by the sensors 10, the control devices 8 establish a door-open/door-closed cycle comprising the following segments: the door-closed state (C1), the door-open state (C2), the dynamic door opening phase (F1) represented by the first time interval (T1) immediately following the detection of the time-based door opening event (S1), and the dynamic door closing phase (F2) represented by the second time interval (T2) immediately preceding the detection of the time-based door closing event (S2). The two dynamic phases (F1, F2) thus take place in the open-door state (C2).

The control devices 8 are designed to memorize the identification codes of the detected tags in the closed-door state (C1) and during the dynamic door closing phase (F1, F2), and to compare the identification codes transmitted by the tags 6 so as to establish whether the detection of a tag is to be associated with a permanent event inside the refrigerator, with an insertion event into the refrigerator or with a removal event from the refrigerator. The data on these events are acquired and stored in the database so as to be available to the user.

According to a preferred form of implementation of the method, the comparison is made by associating with each identification code of a detected tag a particular reference status as a function of the segment of the door opening/closing cycle in which the tag was detected. Each such status is stored and modified in the database with reference to the detected tag concerned.

The reference status of each tag 6 thus evolves as a function of the respective state or phase of the door opening/closing cycle in which the tag concerned was detected.

The control devices 8 serve to associate with each identification code of a detected tag, and to store in the database, a reference status as follows:

The IN/READABLE status to identify the situation where the tag 6 is present in the refrigerator and is detectable in the closed-door state (C1);

The IN/UNREADABLE status to identify the situation where the control devices have detected a tag in the open-door state (C2);

The OUT status to identify an event where a tag 6 is removed from the refrigerator.

In another form of implementation of the invention by means of the programming station 9, the identification codes of the tags 6 that are to be inserted in the refrigerator are automatically given an OUT status.

In the closed door state (C1) the radio frequency transmission systems 5, so instructed by the control devices 8, successively activate the internal antennas 7 for these to scan the compartment 2 of the refrigerator 1 and to perform the detection of the tags 6 that are present. The control devices 8 store in the database the identification codes of the tags detected and assign to each identification code of the tags detected the IN/READABLE status regardless of the preceding reference status.

The following table shows the transition of the reference status determined by the control devices relative to the tags detected during the closed-door state (C1):

| Preceding Reference Status | Current Status |
|---|---|
| OUT | IN/READABLE |
| IN/READABLE | IN/READABLE |
| IN/UNREADABLE | IN/READABLE |

Corresponding to the detection of the time-based door opening event (S1), the control devices 8 count the first time interval (T1) of the dynamic door opening phase (F1) from the start of the time-based door opening event (S1), signaled by the sensors 10, and cause that first interval (T1) to progressively decrease to that event (S1) after a duration of about 0.5-1 second.

After numerous experimental tests it was found that a duration of 0.5-1 second is sufficiently short to ensure that during the first time interval (T1) a user would essentially be unable to place products in, or remove them from, the refrigerator. It should in fact be noted that, normally after 0.5-1 second from the moment the sensors 10 detect its being opened, the refrigerator door, moved by the user, is still substantially nearer its closed position where it would physically inhibit the insertion or removal of products. In any event, it has been found that even if the user opens the door quite rapidly, it would be extremely difficult to insert or remove products in/from the refrigerator within a time of 0.5-1 second elapsing between the door opening event (S1) and the end of the first time interval (T1)

The control devices 8 store the identification codes of the tags detected in the first time interval (T1). Due to the movement of the metal door in this dynamic door opening phase (F1) the detection of the tags 6 will be particularly efficacious. Also identifiable, apart from the tags detected in the closed-door state (C1), will be the tags that are already present in the compartment 2 of the refrigerator 1, but their detection was hindered during the closed-door state (C1).

During the dynamic door opening phase (F1) the control devices 8 assign to the identification codes of the detected tags the IN/UNREADABLE status.

The following table shows the transition of the reference status assigned by the control devices relative to the tags detected during the dynamic door opening phase (F1):

| Preceding Reference Status | Current Status |
| --- | --- |
| OUT | IN/UNREADABLE |
| IN/READABLE | IN/UNREADABLE |
| IN/UNREADABLE | IN/UNREADABLE |

This selection is based on experimental tests from which it is evident how, after a complete door opening/closing cycle, the detectability conditions of the tags can change. Products that may have been placed in the refrigerator or even merely moved inside the refrigerator can in fact become undetectable the moment the door is closed again.

As described below, the control devices 8 serve to determine whether the identification code of a tag retains its IN/UNREADABLE status during a full opening/closing cycle and perhaps for how many cycles, in order to verify the presence of the tag in the refrigerator.

In the dynamic door opening phase (F1) it is theoretically possible that tags are not detected when instead they were detected in the preceding closed-door state (C1); these tags retain their IN/READABLE status. Nevertheless, since the control devices memorize the detected tags either in the closed-door state (C1) or in the dynamic door opening phase (F1), they register an aggregate set of information that represents the entirety of the tags 6 that are present in the refrigerator 1. That information is successively compared with the tags detected during the second time interval (T2) for a determination of the removal, insertion or retention events of the tags in the refrigerator.

The duration of the first time interval (T1) was so selected, after numerous experimental tests, as to minimize to a practically negligible degree the possibility where, during the dynamic door opening phase (F1), the radio frequency transmission system 5 would detect a tag that is outside the refrigerator 1 yet located in a position relative to the refrigerator compartment where it could be detected as the user opens the door.

However, the method according to the invention minimizes the likelihood of any such situation.

In fact, the transition from the reference status OUT to the reference status IN/UNREADABLE, as shown in the preceding table, also takes into account the highly unlikely event in which, during the first time interval (T1) of the dynamic door opening phase (F1), a tag outside the refrigerator 1 would be detected.

From the detection of the time-based door opening event (S1) to the detection of the time-based door closing event (S2), and thus during the entire time span of the open-door state (C2), the control devices 8 continue to detect the tags that are present from the perspective of the compartment 2, storing in memory the time-based event corresponding to the last detection of the tag prior to the time-based door closing event (S2).

In practice, for every detection of a particular tag the control devices 8 store the time-based detection event in a local memory, retaining the information as of the time of the last detection of the tag in the course of the entire open-door state (C2).

The control devices 8 use the stored data for selecting the tags detected during the second time interval (T2).

The open-door state (C2) also encompasses an intermediate phase (F3) that develops between the end of the dynamic door opening phase (F1) and the beginning of the dynamic door closing phase (F2), i.e. essentially while the user performs the tag insertion or removal operations. The method according to the invention ensures that within the intermediate phase (F3) there will be no transition/reference status assignment with regard to the identification codes of the detected tags by the radio frequency transmission systems 5. Accordingly, the identification codes of the tags detected during the intermediate phase (F3) retain the same reference status IN/UNREADABLE that was acquired during the dynamic door opening phase (F1).

Once the products have been placed in the compartment or removed from it, the user recloses the refrigerator door.

Upon detection of the time-based door closing event (S2) the control devices 8 stop storing the time-based tag detection event in memory.

The control devices 8 now address a second time interval (T2), counted backward from the time-based door closing event (S2) and preceding that time-based event (S2) with a duration of about 0.5-1 second.

The short duration of the second time interval (T2) is such that it is physically impossible for the user to place an appropriately tagged product in, or remove it from, the refrigerator.

After numerous experimental tests it was found that a duration of 0.5-1 second is short enough to ensure that during the second time interval (T2) a user would not be physically able to insert or remove products in/from the refrigerator within the time available.

It should in fact be noted that, normally after 0.5-1 second from the moment the sensors 10 detect its being opened, the door 4 of the refrigerator 1, moved by the user, is still substantially nearer its closed position where it would physically inhibit the insertion or removal of products.

Also, after numerous experimentations, the duration of the second time interval (T2) was so selected as to make it highly improbable for the radio frequency transmission systems 5 during the second time interval (T2) of the dynamic door closing phase (F2) to detect a tag that is outside the refrigerator yet located in a position relative to the refrigerator compartment where it could still be detected as the user closes the door.

The control devices 8 select from the local memory the identification codes of the tags 6 whose last time-based detection event falls within the second time interval (T2). The control devices 8 thus create a selection list in the local memory that contains the identification codes of the tags selected.

Moreover, as described further above, the movement of the metal door makes the detection of the tags in the compartment especially efficacious in that, during the dynamic door closing phase (F2) every one of the tags present in the refrigerator becomes detectable after the user has performed the operations of loading and/or removing the products into/from the refrigerator.

The control devices 8 compare the identification codes in the selection list with the identification codes of the tags detected in the closed-door state (C1) and in the dynamic door opening phase (F1).

The tags 6 whose identification codes are present in the selection list only and have not been memorized during the closed-door state (C1) and in the dynamic door opening phase (F1) will be the tags inserted in the refrigerator by the user during the open-door state (C2).

The control devices 8 store the reference status of the identification codes present in the list as follows:

| Preceding Reference Status | Current Status |
|---|---|
| OUT | IN/UNREADABLE |
| IN/READABLE | IN/UNREADABLE |
| IN/UNREADABLE | IN/UNREADABLE |

The transition from the OUT status to the IN/UNREADABLE status characterizes the event of tag insertion in the refrigerator by the user during the open-door state (C2).

The identification codes present in the selection list but not detected in the closed-door state (C1) nor during the dynamic door opening phase (F1) undergo a transition from the OUT reference status (i.e. the tags have been detected only during the intermediate phase (F3)) to the IN/UNREADABLE reference status (the tags are detected in the dynamic door closing phase (F2) have been inserted in the refrigerator).

However, the transition from the OUT status to the IN/UNREADABLE status takes into account the rare and highly improbable situation where a tag that is located outside the refrigerator is nevertheless detected during the dynamic door closing phase (F2).

Through the evolution of the reference status of the tags during a full door opening/closing cycle, the method according to the invention makes it possible to verify whether a tag, even if detected during the dynamic door closing phase (F2), is actually not present in the refrigerator. In fact, the identification code of a tag located outside the refrigerator but nevertheless detected, is placed by the control devices 8 in the IN/UNREADABLE reference status as indicated in the above table. The control devices can check whether the identification code of a tag remains in the IN/UNREADABLE status during a full door opening/closing cycle and for how many cycles, so as to verify whether the tag 6 is present in the refrigerator.

The remaining two transitions shown in the above table refer to those tags that have been detected during at least one of the closed-door states (C1) and the dynamic door opening phase (F1) and whose identification codes are included in the selection list. These tags were thus already present in the refrigerator and remain there after the door is closed.

The tags whose identification codes are not present in the selection list but have been memorized during at least one of the closed-door states (C1) and the dynamic door opening phase (F1) will be the tags removed from the refrigerator by the user during the open-door state (C2).

The control devices 8 store the reference status of the identification codes that are not included in the list as follows:

| Preceding Reference Status | Current Status |
|---|---|
| OUT | IN/UNREADABLE |
| IN/READABLE | OUT |
| IN/UNREADABLE | OUT |

The transition from the OUT reference status to the IN/UNREADABLE reference status relates to the identification codes of the tags that have been detected solely in the intermediate phase (F3) but have not been detected during the second time interval (T2) of the dynamic door closing phase (F2).

A situation of that kind can occur when a tag is inserted in the refrigerator and is removed from the refrigerator during the intermediate phase (F3) between the dynamic door opening phase (F1) and the dynamic door closing phase (F2). Since that tag is not detected during the dynamic door closing phase (F2), its identification code will not appear in the selection list. In order to resolve the ambiguity in such a situation, the control devices 8 serve to check whether the identification code of that tag maintains its IN/UNREADABLE status during a full opening/closing cycle, and perhaps for how many such cycles, in order to verify the presence of the tag in the refrigerator.

The transitions from the IN/READABLE status to the OUT status and from the IN/UNREADABLE to the OUT status signify the removal of the tags from the refrigerator. These tags were present in the refrigerator insofar as they were detected during at least one of the closed-door states (C1) and the dynamic door opening phase (F1) but were not detected in the second time interval (T2) of the dynamic door closing phase (F2), and will thus be the tags 6 that are removed from the refrigerator 1 during the open-door state (C2).

The method according to the invention checks whether a tag previously detected during the open-door state (C2) and whose identification code is assigned the reference status IN/UNREADABLE is no longer detected during a predetermined number of full door opening/closing cycles. It suffices to resolve such an ambiguous situation, already described, by briefly inserting the tag in the refrigerator during the open-door state (C2), as also in those rare and very unlikely situations in the dynamic door opening and closing phases (F1, F2) where tags are detected which are located outside the refrigerator.

With regard to identification codes of tags that were not detected during a complete door opening/closing cycle but had been detected in a previous cycle, the control devices 8 initiate the following reference-status transitions:

| Preceding Reference Status | Current Status |
|---|---|
| OUT | OUT |
| IN/READABLE | OUT |
| IN/UNREADABLE | IN/UNREADABLE OUT |

If the identification code is in the reference status IN/READABLE and is no longer detected in a full door opening/closing cycle, such identification code will be assigned the OUT reference status, i.e. the tag concerned will be viewed as being no longer present in the refrigerator.

Conversely, in a case where the identification code is in the IN/UNREADABLE status, the control devices 8 track the number of full cycles during which the tag was not detected. That number of cycles is used to determine the possible transition in the reference status of the identification code. If the tag is not detected within a predetermined number of cycles, it will be transitioned from the IN/UNREADABLE status to the OUT status; otherwise, if that number of cycles is not attained, the identification code of the tag concerned keeps its IN/UNREADABLE status.

By means of the programming station 9 it is possible to assign to the identification code of the tag a series of characteristic data pertaining to the product being placed in the refrigerator 1. Such data can include for instance the product classification, weight, the storage time and temperature. The programming station 9 includes the control devices 8, the radio frequency transmission systems 5, external antennas 11 set up opposite the door 4 outside the refrigerator 1, and at least one graphical interface 12. By means of the external antennas 11 the radio frequency transmission systems 5 serve to detect the presence of a tag that is being moved relative to the programming station 9, i.e. that is essentially in the proximity of the door 4, and to signal such detection to the control devices 8.

The external antennas 11 will only be activated when the door is closed.

The control devices 8 can receive from the user the product-related data via the graphical interface 12, assigning and/or updating such data for the identification code of the tag detected by the radio frequency transmission systems 5 via the external antennas 11.

According to a preferred form of implementation of the method, the control devices 8 can assign to the identification codes of tags, detected via the external antennas 11, the reference status OUT.

When the tag is placed in the refrigerator 1, the control devices 8 memorize the identification code of the tag as described above, together with the product-related characteristic data.

The graphical interface 12 allows the user to communicate with the control devices 8 for inputting the information relating to the products contained in the refrigerator 1.

During the closed-door state (C1), with the programming station 9 activated, the control devices 8 receive via the internal antennas 7 the data regarding the detection results obtained by the radio frequency transmission systems 5. In order to avoid mistaking the detection of a tag in the refrigerator 1 as a reading by the programming station 9, the control devices 8 evaluate the time interval between the last detection of the tag obtained in the refrigerator and the first detection of the same tag by the external antennas 11. That time interval must not be less than a predefined time-based parameter which represents the minimum acceptable time between the last detection of the tag in the refrigerator and the first detection of the same tag by the antennas of the programming station 9. If the time interval is less than that parameter, the control devices 8 will not accept as valid the detection by the external antenna.

The method according to the invention can be implemented with numerous modifications and variations without departing from the scope of the same inventive concept, and all of its details can be replaced by technically equivalent elements.

The invention claimed is:

1. Method for monitoring products in a refrigerator, which refrigerator (1) comprises at least one compartment (2) for holding products (3), a door (4) designed to close off said compartment (2), radio frequency transmission systems (5) serving to communicate with a plurality of transponders (6) that are assigned to said products (3) for the detection of the presence of the transponders (6) in the compartment (2), each transponder (6) being able to transmit a specific identification code, a control device (8) designed to memorize and compare the identification codes, sensors (10) connected to said control device (8), adapted to monitor said door (4) for detecting a time-based door-opening event and a time-based door-closing event, said method being characterized in that it includes:

detecting by means of said sensors (10) a time-based door opening event and a time-based door closing event for a differentiation, by means of said control device (8), between a closed-door state and an open-door state;

providing, by means of said control device (8), after detecting the time-based door opening event, a first time interval that immediately follows said time-based door opening event and is representative of a dynamic door opening phase, said first time interval being counted from a beginning of the time-based door opening event and having a predefined duration short enough to not allow a user to insert or remove any products (3) during said first time interval of the dynamic door opening phase;

detecting the presence of products (3) in the compartment (2) during that first time interval by the detection of the transponders (6) associated to said products (3) by means of said radio frequency transmission systems (5), and memorizing, by means of said control device (8), the identification codes of the detected transponders;

continuously detecting, by means of said radio frequency transmission system (5), during an entire open door state, the presence of transponders (6) in relation to the compartment (2), memorizing, by means of said control device (8), the time-based detection events of the transponders (6) and updating, by means of said control device (8), said time-based event as a function of a last detection of the transponders by the radio frequency transmission system (5);

providing, by means of said control device (8), after detecting the time-base door closing event, a second time interval that immediately precedes said time-based door-closing event and is representative of a dynamic door closing phase, said second time interval being counted backward from a beginning of said time-based door-closing event and having a predefined duration short enough to not allow a user to insert or remove any products (3) during the said second time interval of the dynamic door closing phase;

selecting, by means of said control device (8), the identification codes of the transponders (6) whose memorized time-based detection event during the open-door state falls within said second time interval of the dynamic door closing phase;

comparing, by means of said control device (8), the identification codes of the transponders (6) thus selected with those detected during said first time interval of the dynamic door opening phase;

assuming, by means of said control device (8), that the transponders (6) detected only during said second time interval have been inserted in the compartment (2) of the refrigerator (1) during the open-door state; and assuming, by means of said control device (8), that the transponders (6) detected during said first time interval but were not detected during the second time interval have been removed from the compartment (2) of the refrigerator (1) during the open-door state.

2. Method as in claim 1, comprising:

computing, by means of said control device (8), in response to the detection of the time-based door-opening event, the first time interval, said first time interval having a duration of about 0.5-1 second.

3. Method as in claim 1, comprising:

memorizing, by means of said control device (8), the time-based event of the last detection of the transponders (6) during said open-door state.

4. Method as in claim 3, comprising:

generating, by means of said control device (8), a selection list containing the identification codes of the transponders (6), whose last time-based detection event falls within the second time interval.

5. Method as in claim 4, comprising:

assigning, by means of said control device (8), an IN/UNREADABLE reference status to the identification codes included in the list, and assuming, by means of said control device (8), that the transponders (6) that were not detected during the closed-door state and during the dynamic door opening phase and whose identification codes have the IN/UNREADABLE status, have been inserted in the refrigerator during the open-door state.

6. Method as in claim 4, comprising:

assigning, by means of said control device (8), an IN/UNREADABLE status to the identification codes contained in the list, assuming, by means of said control device (8), that the transponders (6) detected during at least one of the closed-door states and the dynamic door opening phase and whose identification codes are IN/UNREADABLE, are transponders (6) that remain in the refrigerator (1).

7. Method as in claim 4, comprising:

assigning, by means of said control device (8), the reference status IN/UNREADABLE to the identification codes that are not included in the list and were detected only during the intermediate phase.

8. Method as in claim 4, comprising:

assigning, by means of said control device (8), an OUT reference status to the identification codes of the transponders (6) that are not included in the list and were detected during at least one of the closed-door states and the dynamic door opening phase, and assuming, by means of said control device (8), that said transponders (6) whose identification codes have the OUT status have been removed from the refrigerator during the open-door state.

9. Method as in claim 1, comprising:

backward counting, by means of said control device (8), in response to the detection of the time-based door closing event, the second time interval of the dynamic door closing phase starting from the time-based door-closing event, said second time interval elapsing, prior to the time-based door closing event, after a duration of about 0.5-1 second.

10. Method as in claim 1, comprising:

identifying, by means of said control device (8), the transponders (6) that were detected during the closed-door state but were successively no longer detected during a full door opening/closing cycle, and assuming, by means of said control device (8), that said transponders (6) are no longer present in the refrigerator.

11. Method as in claim 1, comprising:

identifying, by means of said control device (8), the transponders (6) whose identification codes have an IN/READABLE reference status and which are no longer detected in a full door opening/closing cycle, assigning, by means of said control device (8), an OUT reference status to the identification codes of the transponders (6) so identified, and assuming, by means of said control device (8), that the transponders (6) whose identification codes have the OUT reference status are no longer in the refrigerator.

12. Method as in claim 1, comprising:

identifying, by means of said control device (8), the transponders (6) that were detected during the open-door state but are successively no longer detected during a predefined number of full door opening/closing cycles, and assuming, by means of said control device (8), that these transponders (6) are no longer in the refrigerator.

13. Method as in claim 1, comprising:

identifying, by means of said control device (8), the transponders (6) whose identification codes have an IN/UNREADABLE reference status and which have no longer been detected during a predefined number of full door opening/closing cycles, assigning, by means of said control device (8), an OUT reference status to the identification codes of the transponders (6) so identified, and assuming, by means of said control device (8), that the transponders (6) whose identification codes have the OUT status are no longer in the refrigerator.

14. Method as in claim 1, comprising:

assigning to the identification codes of the transponders (6) intended to be inserted in the refrigerator (1), an OUT reference status, using a programming station.

15. Method as in claim 1, further comprising:

scanning, in a closed-door state preceding said time-based door opening event, said compartment (2) by means of radio frequency transmission systems (5) for the detection of the presence of transponders (6), and memorizing, by means of said control device (8), the identification codes of the detected transponders;

comparing, by means of said control device (8), the identification codes of the transponders (6) whose time-based detection event during the open-door state falls within said second time interval of the dynamic door closing phase, with those detected during the closed-door state; and assuming that the transponders (6) detected during the closed-door state but were not detected during the second time interval have been removed from the compartment (2) of the refrigerator (1) during the open-door state.

16. Method as in claim 15, comprising:
providing a full door opening/closing cycle including the following segments: the closed-door state, the open-door state, the dynamic door opening phase represented by the first time interval, and the dynamic door closing phase represented by a second time interval, said two dynamic phases taking place in the open-door state.

17. Method as in claim 16, comprising:
assigning, by means of said control device (8), to each identification code a transponder (6), of a predetermined reference status as a function of the segment of the door opening/closing cycle in which the transponder (6) concerned was detected; and
memorizing, by means of said control device (8), that reference status.

18. Method as in claim 17, comprising:
assigning, by means of said control device (8), an IN/READABLE status to the identification code of the transponders (6), detected during said closed-door state.

19. Method as in claim 18, comprising:
providing, by means of said control device (8), an intermediate phase, within said open-door state, that develops between the dynamic door opening phase hand the dynamic door closing phase,
setting, by means of said control device (8), whereby within said intermediate phase no transition takes place in the reference status for the identification codes of the transponders (6) detected during the said intermediate phase, said identification codes maintaining the same reference status IN/UNREADABLE assigned in relation to the dynamic door opening phase.

20. Method as in claim 17, comprising:
assigning by means of said control device (8), an IN/UNREADABLE reference status to the identification codes of the transponders (6), detected during the said first time interval of the dynamic door opening phase.

* * * * *

UNITED STATES PATENT AND TRADEMARK OFFICE
CERTIFICATE OF CORRECTION

| | |
|---|---|
| PATENT NO. | : 7,644,017 B2 |
| APPLICATION NO. | : 11/550437 |
| DATED | : January 5, 2010 |
| INVENTOR(S) | : Pippia et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 257 days.

Signed and Sealed this

Sixteenth Day of November, 2010

David J. Kappos
*Director of the United States Patent and Trademark Office*